May 18, 1954     S. W. ALDERSON     2,678,709
CLUTCH FOR ARTIFICIAL ARMS
Original Filed July 10, 1948     6 Sheets-Sheet 1
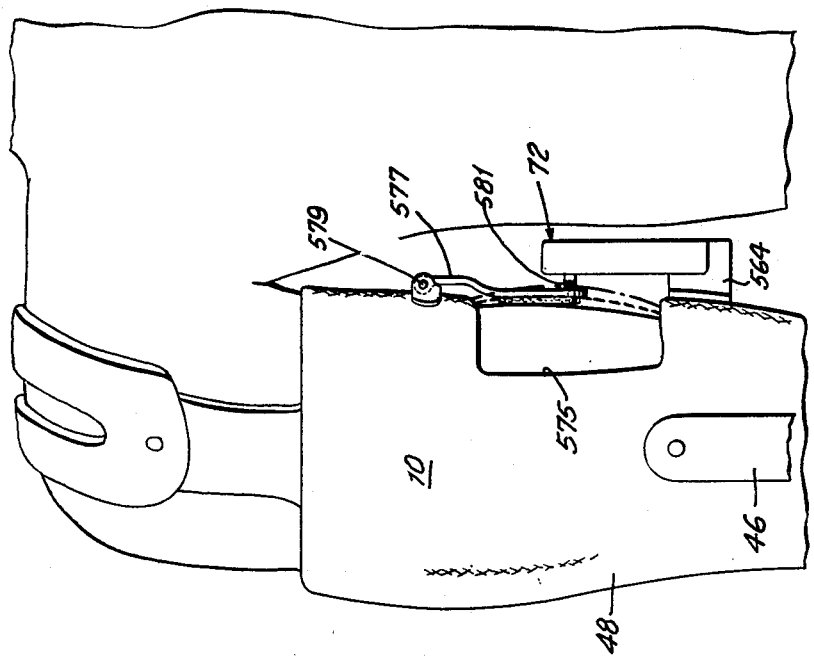
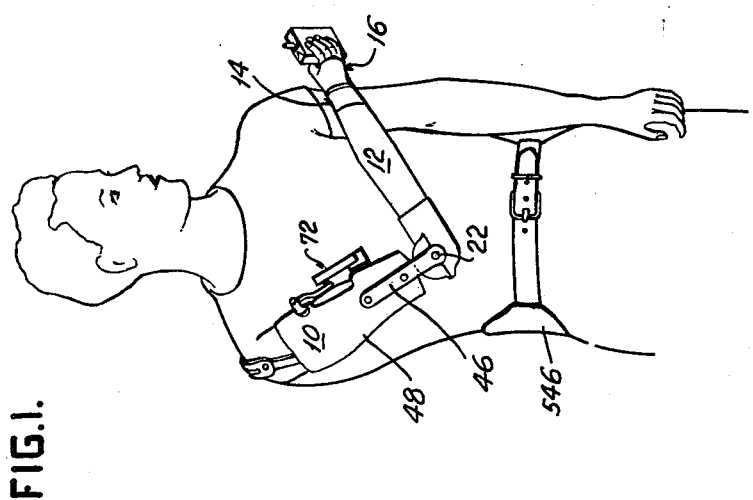
INVENTOR
*Samuel W. Alderson.*
BY
*John B. Sponsler*
AGENT

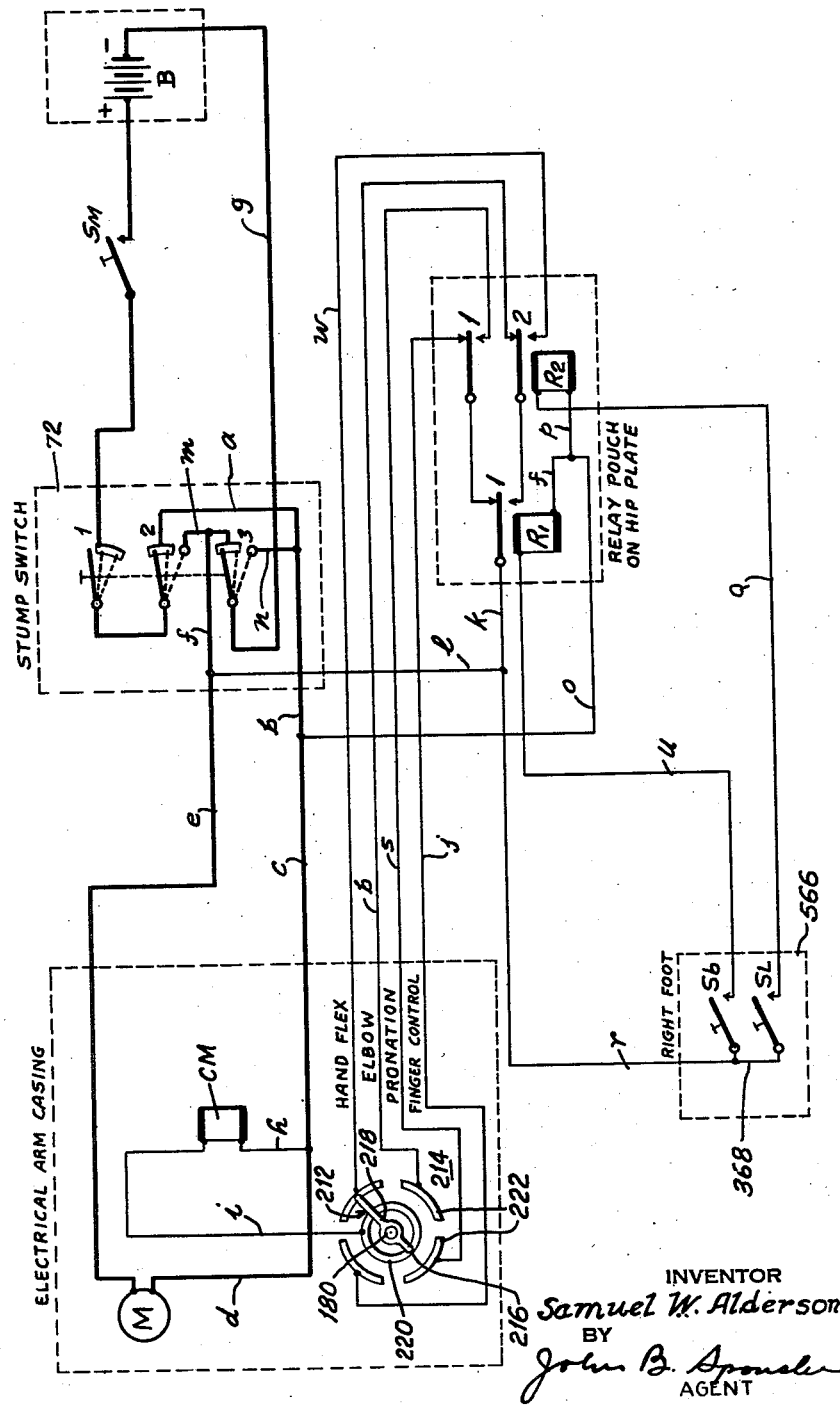

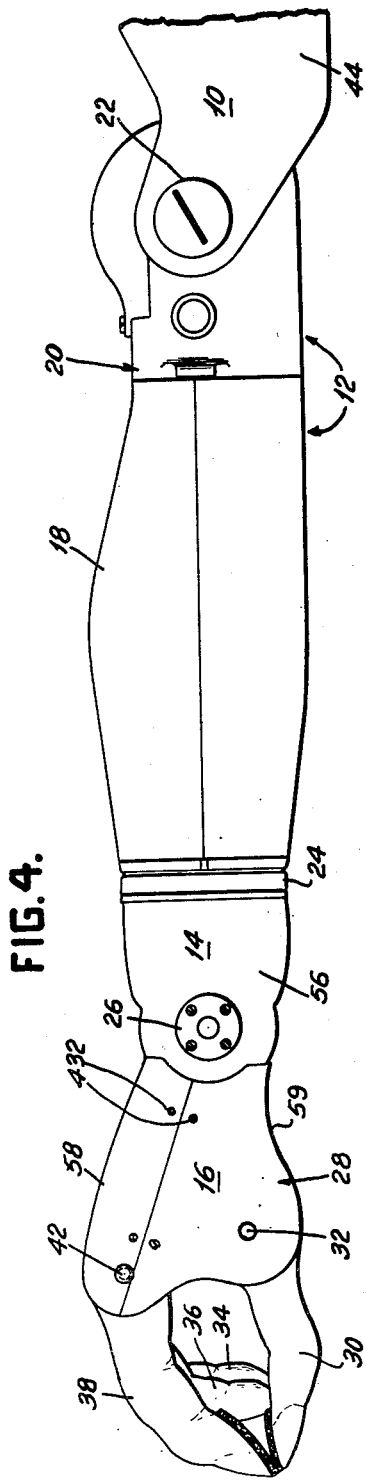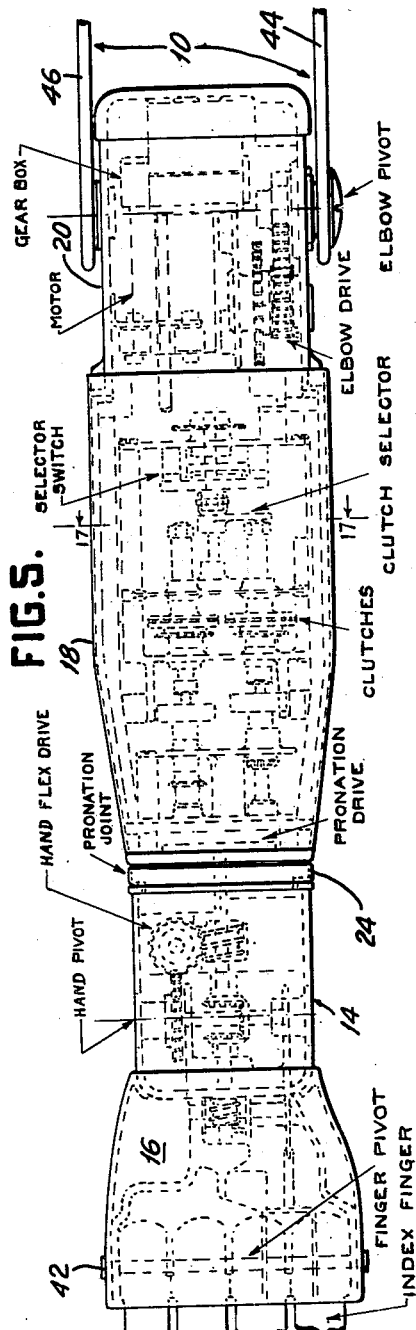

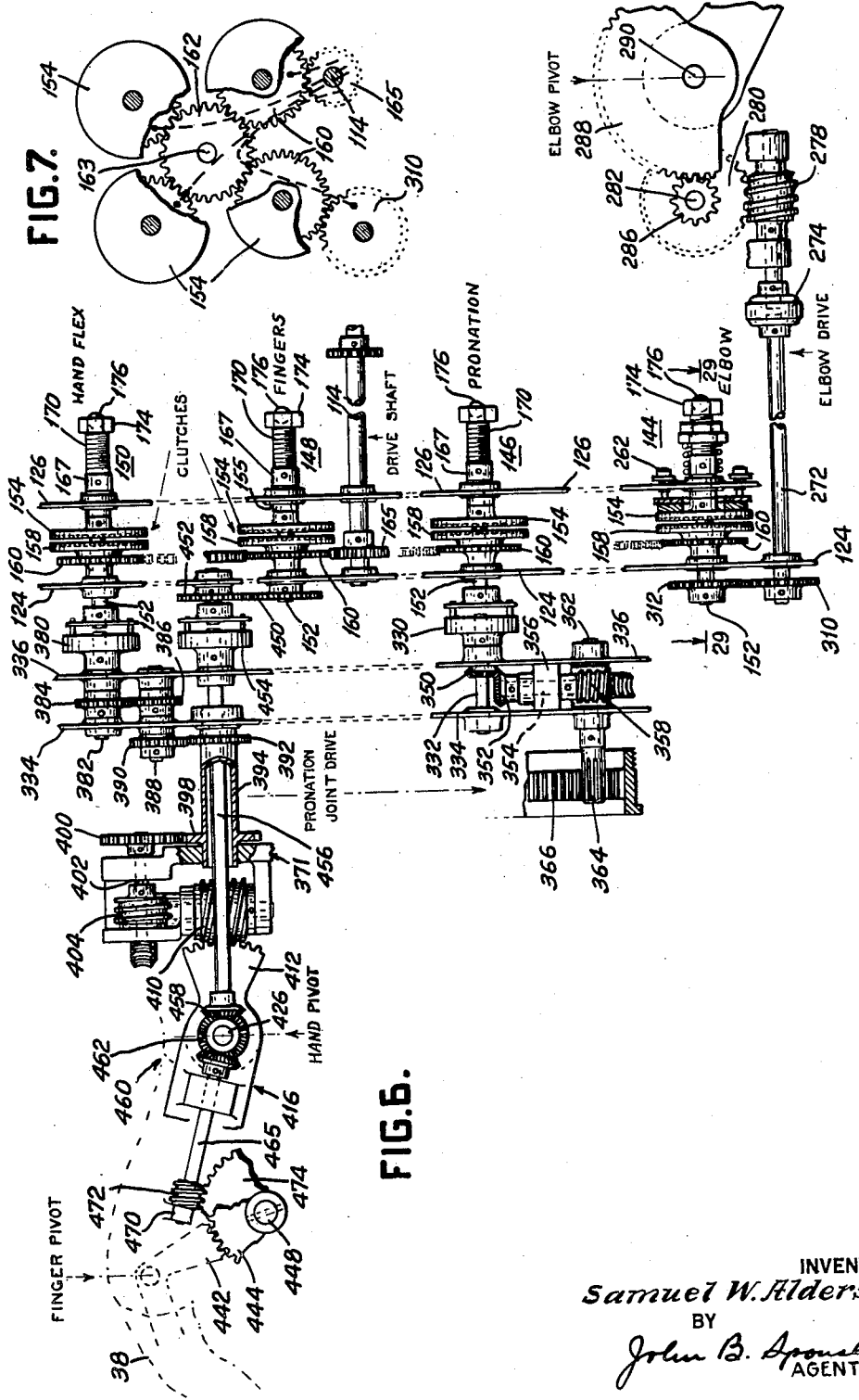

May 18, 1954  S. W. ALDERSON  2,678,709
CLUTCH FOR ARTIFICIAL ARMS
Original Filed July 10, 1948  6 Sheets-Sheet 5
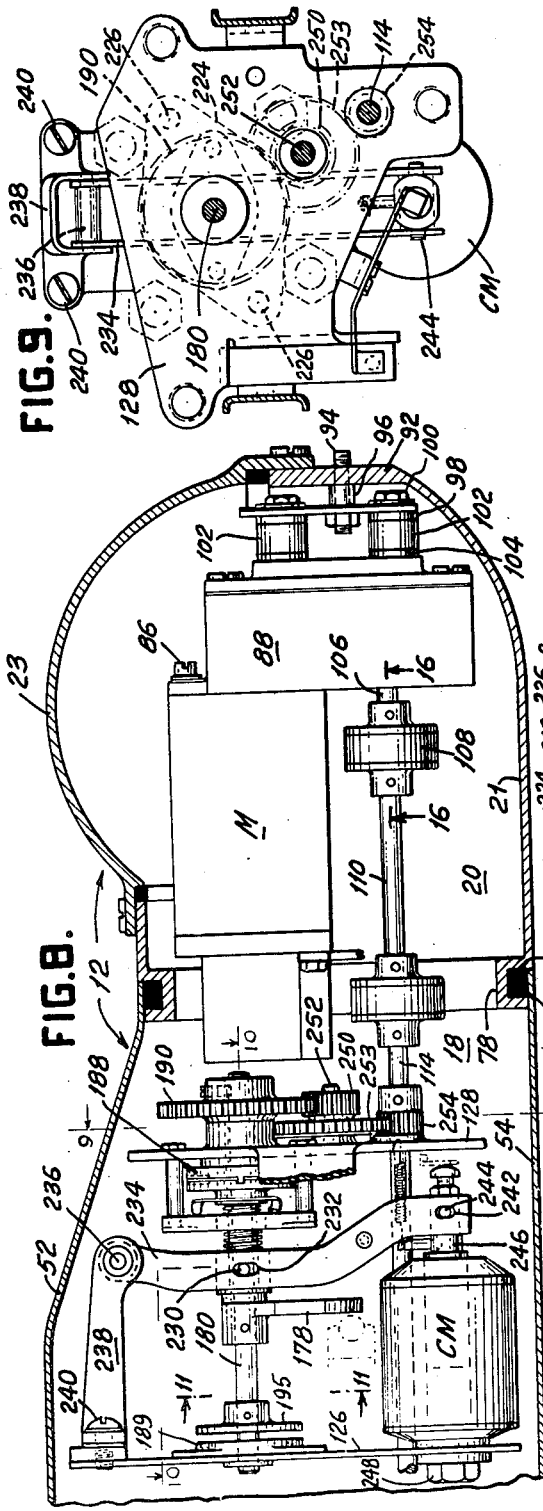
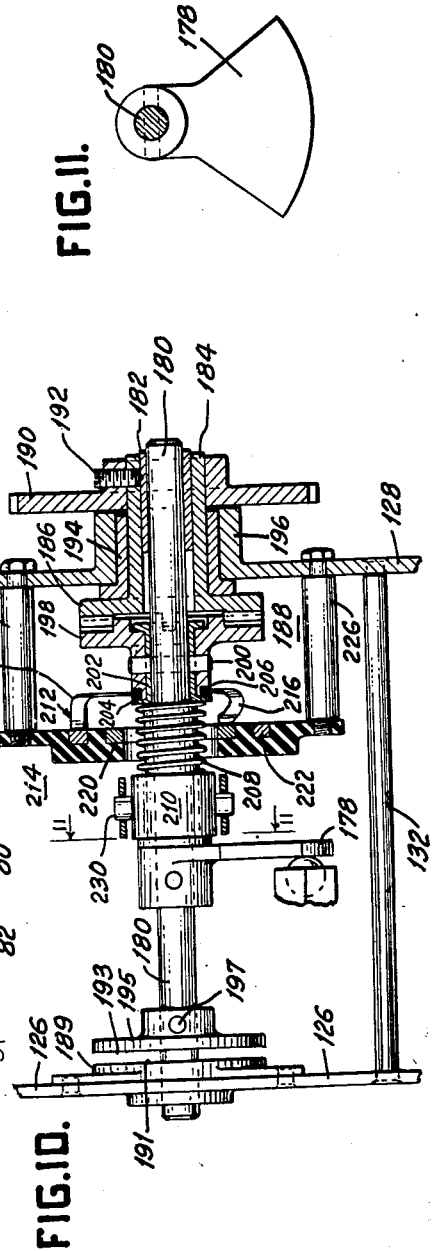
INVENTOR
Samuel W. Alderson.
BY
John B. Sprouse
AGENT May 18, 1954  S. W. ALDERSON  2,678,709
CLUTCH FOR ARTIFICIAL ARMS
Original Filed July 10, 1948  6 Sheets-Sheet 6
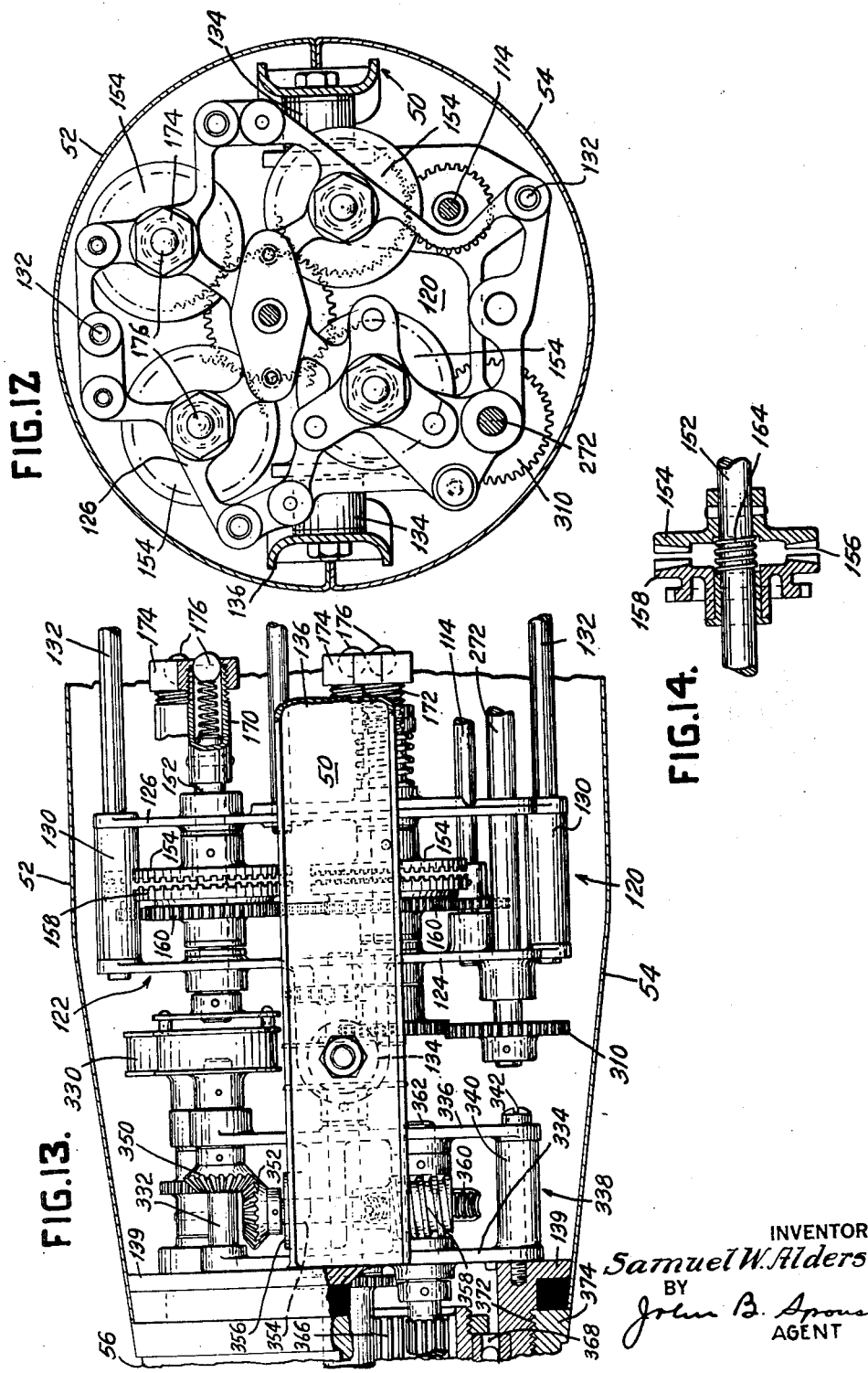
INVENTOR
Samuel W. Alderson
BY
John B. Sprouse
AGENT Patented May 18, 1954

2,678,709

UNITED STATES PATENT OFFICE 2,678,709

CLUTCH FOR ARTIFICIAL ARMS

Samuel W. Alderson, New York, N. Y.

Original application July 10, 1948, Serial No. 38,018. Divided and this application May 17, 1951, Serial No. 226,882

7 Claims. (Cl. 192—48)

The present invention relates to clutch mechanism employed in electrically operated artificial arms.

This application relates to subject matter found in a copending application, Ser. No. 38,018, filed July 10, 1948, now Patent Number 2,580,987, issued January 1, 1952, of which this application is a division. Reference is also made to Patent 2,592,842, issued April 15, 1952, and Patent 2,640,994 issued June 9, 1953, both divisions of the said application Serial Number 38,018, filed July 10, 1948, as well as Patent 2,580,987 for a full disclosure of the present invention and the manner of its employment.

An object of the invention is to provide an electrical arm capable of a plurality of movements in which any one of them may be selectively performed without disturbing or otherwise affecting the others.

Another object of the invention is to provide an electrically driven arm of this type wherein the motive force by means of which the electrical arm is powered consists of a relatively small lightweight compact motor which is wholly contained within the forearm section of the arm in the elbow region thereof and which in the assembled arm is completely concealed from view.

Another and important object of the invention is to provide a novel type of selective clutch mechanism likewise wholly contained within the forearm section for selectively controlling by a common drive from the motor the four independent types of arm movement briefly outlined above.

A still further object of the invention is to provide an electrical arm of this type in which the selective clutch mechanism consists of a self-contained unit capable of being installed in or removed from the arm with facility as a unit and which, when installed, is mounted in the forearm section by a resilient floating connection, thereby reducing vibration and protecting the same from possible shock and, as a consequence, contributing toward the elimination of noise.

Yet another object of the invention is to provide an electrical arm capable of the four independent types of motions set forth above in which the motions may be reversed at the will of the amputee by the simple expedient of reversing the direction of rotation of the motor shaft while maintaining any one of the selected types of control in effect.

Another object of the invention is to provide an artificial arm including a selective clutch mechanism of the type briefly outlined above in which selection of the particular type of motion desired may be made under the control of a series of contacts adapted to be operated by relative movement of an anatomical part of the body, as for example, the big and little toes of one foot of the amputee.

The selective clutch mechanism referred to above is reversible in all four phases of its operation. An electrical control means for selectively actuating the clutch mechanism is provided under the control of the amputee. A novel form of switch mechanism is located in one of the shoes of the user and may be manipulated by the toes for selectively operating the clutch mechanism to obtain the desired motions of the component parts of the arm. In the case of an amputee having a sufficiently long above-the-elbow stump including an active biceps, the stump section has associated therewith a stump switch adapted to be operated by a partial tensing of the stump biceps to provide a master control capable of energizing or deenergizing the motor so that motion or no motion of the arm is effected, as desired. The stump switch is also used to control the direction of motion of the component parts of the arm after a selection of the type of motion desired has been made by the electrical foot controls.

In the drawings:

Fig. 1 is a perspective view of the electrical arm proper showing the same being worn by a right-arm amputee having an upper arm stump of substantial length and also showing the harness by means of which the arm is retained on the body of the user.

Fig. 2 is an enlarged fragmentary view of a portion of the upper arm section of the electrical arm illustrating the manner in which a stump switch employed in connection with the invention may be manipulated by the biceps muscle of the amputee.

Fig. 3 is a circuit diagram of the electrical connections for the arm.

Fig. 4 is a fragmentary side elevational view of the electrical arm showing the jointed sections thereof.

Fig. 5 is a fragmentary top plan view of the structure shown in Fig. 4 and including dotted line illustrations of internal structure of the arm mechanism, together with suitable legends therefor.

Fig. 6 is a schematic view of the various drive mechanisms and clutches employed in connection with the electrical arm illustrating the manner in which the desired arm movements may be attained upon proper clutch selection.

Fig. 7 is a schematic end view of the selective clutch mechanism employed in connection with the present invention with the clutch centers in their proper positions.

Fig. 8 is a fragmentary enlarged detailed sectional view taken longitudinally through the elbow joint structure and a portion of the forearm section proper showing the electric motor, the main driving shaft and a portion of the selecting devices for the selective clutch mechanism employed in connection with the electrical arm.

Fig. 9 is a sectional view taken substantially along the line 9—9 of Fig. 8.

Fig. 10 is a sectional view taken substantially along the line 10—10 of Fig. 8.

Fig. 11 is a sectional view taken substantially along the line 11—11 of Fig. 10 and showing in detail a radial clutch actuating arm employed in connection with the present invention.

Fig. 12 is a sectional view taken substantially along the line 17—17 of Fig. 5.

Fig. 13 is a side elevational view of the structure shown in Fig. 12 with the casing broken away. This view shows the hand and wrist pronation drive mechanism.

Fig. 14 is a detailed sectional view of one of the clutch units proper employed in connection with the present invention.

Brief description

Referring now to the drawings in detail and in particular to Figs. 4 and 5, the electrical arm involves in its general organization a rigid upper arm structure fragmentarily shown at 10, a rigid forearm structure or assembly 12, a wrist assembly 12, a wrist assembly 14 and a hand assembly 16. The forearm assembly 12 includes a forearm section proper 18 and an elbow joint structure or assembly 20, the latter being pivotally connected as at 22 to the upper arm structure 10. The wrist assembly 14 is coaxial with the forearm section 18 and is pivotally connected to the free end of the latter for rotational movements in either direction about the common axis of the two sections by means of a pronation joint structure 24 which is common to the two sections.

The wrist assembly 14 and hand assembly 16 are pivotally connected together by a hand flexion joint 26. The hand assembly 16 includes a palm portion 28 and four independently movable digit or finger sections including a rigid thumb 30 pivotally secured as at 32 to the palm portion 28, a multiply articulated little finger 34, a multiply articulated ring finger 36 and separately molded index and middle fingers 38 and 40 respectively, which are movable in unison relative to the palm portion 28. As shown in Fig. 5, the index, middle, ring and little fingers are pivoted for swinging movement relative to the palm portion 28 on a common finger pivot in the form of a pintle pin 42.

The electrical arm is powered by means of a small, compact, portable battery unit B (Fig. 3) adapted to be conveniently carried in the trousers pocket 68, preferably on the same side as the amputation. The control of the various movements of the electrical arm is effected by means of a series of electrical contacts contained in one of the shoes of the user, as for example, the right shoe 70, and also under the control of a stump switch assembly 72 (Figs. 1, 2, and 3). The control contacts in the shoe are utilized for the purpose of effecting the selected type of movement for the various parts of the arm, while the stump switch is employed to initiate the selected type of movement as well as for selecting a forward or reverse movement, all in a manner that will be made clear presently.

The motor, motor drive and supporting structure therefor

The motor, outlined in Fig. 5, which is of the direct current, reversible, permanent magnet type, is supported within the elbow joint structure 20 by means of a resilient floating connection. The elbow joint structure 20 includes a base casting 21 which is of box-like configuration and which has an open upper end adapted to be closed by means of a cover plate 23. The forward end of the elbow joint structure is provided with a rectangular channel portion 78 affording an external groove 80 adapted to receive therein a suitable sealing gasket 82 (Fig. 8) which may be formed of soft rubber or the like, and which affords a seal for the forearm section proper 18 when the cover plates 52 and 54 are in position.

The motor M is in the form of a substantially rectangular box-like casing which is bolted or otherwise secured as at 86 to a gear reduction assembly 88, likewise of box-like configuration, and which is mounted by means of a floating connection from the casting 21. The floating connection just referred to includes an upstanding bracket which is secured to the end wall 92 of the casting 21 by means of through-bolts 94 and which is spaced therefrom by means of spacing collars 96. A plurality of attachment plates 98 are secured to the bracket by means of studs 100 and these attachment plates 98 are fastened to respective supporting pads 102 which may be formed of resilient material such as rubber. The supporting pads 102 are fastened to respective attachment bosses 104 carried on the casing of the gear reduction assembly 88 and thus the gear reduction device and the motor are yieldingly supported from the casting 21 with the solid resilient pads 102 constituting the sole supporting means for the motor and gear reduction assembly.

The gear reduction device 88 is provided with an output shaft 106 which is connected through a resilient coupling 108 to a floating shaft 110 which in turn is connected through a second resilient coupling to a shaft 114, which may be regarded as the main drive shaft leading to the various gear train mechanisms employed for effecting the desired movements of the component parts of the electrical arm.

The selective clutch assembly

Referring now to Figs. 6, 7, 8, 9, 12, 13 and 14, the selective clutch mechanism is designated in its entirety at 120 in Figs. 12 and 13, and is a unitary self-contained assembly which is mounted within the forearm section proper 18 by means of a floating connection. The drive shaft 114 constitutes the input drive for this clutch assembly.

The clutch assembly involves in its general organization a rigid but floating frame-like structure 122 including a front end plate 124 (Figs. 6 and 13), a medial plate 126 and a rear end plate 128 (Fig. 10). The plates 124 and 126 are connected together by means of spacing members 130 and the medial plate 126 and end plate 128 are connected together by means of spacing members 132. The end plate 124 is provided with a pair of laterally extending ears 134 which are supported from a pair of longitudinally extending parallel frame members 136 and 138 integrally formed with an end piece in the form of a ring 139 constituting a part of the forearm framework 50. The frame members 136 and 138 are generally of channel-shaped construction to lend strength to the structure and they may be integrally cast with one element of the pronation joint structure 24 at the front of the forearm section proper 18.

The clutch mechanism proper 120 includes a series of four clutch elements 144, 146, 148 and 150. The clutch element 144 is adapted to go into operation to effect the elbow drive or, in other words, to attain elbow flexion. The clutch 146 is adapted to go into operation to effect hand and wrist pronation at the pronation joint 24. The clutch 148 is adapted to go into operation to effect opening and closing movements of the index and ring finger assembly relative to the thumb. The clutch 150 is adapted to go into operation to effect hand flexion, all in a manner that will presently be set forth.

The clutch elements 144, 146, 148 and 150 are substantially identical in construction and are mounted in the floating clutch assembly 122 at substantially equally spaced points arranged about a common center and these elements occupy the same transverse plane.

Each clutch element includes a supporting shaft 152 which is rotatably journaled in the front and medial plates 124 and 126. The clutch elements are of the reverse acting type, that is to say, the driven element of the clutch may coact with the driving element thereof to effect rotation of the clutch elements in opposite directions to reverse whichever character of motion of the electrical arm is selected. A driven element 154 is mounted upon and secured to the shaft 152. This element is in the form of a circular disc having outwardly projecting clutch teeth 156 on one side thereof. These teeth oppose a series of similar teeth provided on the driving element 158 of the clutch. The driving element is similar in configuration to the driven element and is rotatably mounted on the shaft 152 in close proximity to the driven element. Each driving element includes an integrally formed gear 160 and all four of the gears 160 are in constant mesh with an idler gear 162 mounted on a shaft 163 rotatably journaled in the front and medial plates 124, 126. The gear 160, which is integrally formed with the clutch 148 and which controls the opening and closing movements of the fingers, meshes with a driving gear 165 mounted on the drive shaft 114 and thus when the motor is energized and the drive shaft 114 is rotated, a drive is transmitted from the gear 165 to the gear 160 of the clutch 148 and from thence through the idler gear 162 to all of the clutch elements 158 so that these elements rotate in unison.

When the arm is at rest and no relative motion between any of the component parts thereof is contemplated, the drive shaft 114 remains stationary due to lack of energization of the motor M. As soon as a selected movement of the arm is contemplated, the motor M is energized by means of a suitable control to be described subsequently and the drive shaft 114 commences to rotate in the selected direction, thus causing all four of the driving gears 160, and consequently all four of the driving elements 158, to rotate in unison. Until one of the clutches 144, 146, 148 or 150, as the case may be, is thrown into meshing engagement no movement of any parts of the arm will result and when the selected clutch is finally engaged one of the four types of movement, namely, opening and closing of the fingers, hand and wrist pronation, hand flexion or elbow flexion, is attained. In Fig. 6 the various drives for effecting these motions is schematically shown.

Each shaft 152 is slidably, as well as rotatably, mounted in the front and medial plates 124, 126 and the limited amount of sliding movement of which the shaft is capable is determined by the provision of a collar 167 which is secured on the shaft and by the position of the driven clutch element 154. In the normal open or inoperative position of the clutch, the clutch element 154 abuts against a supporting bushing 155 which is anchored in the medial plate 126. In the closed or operative position of the clutch, the collar 167 abuts against this bushing. The clutch elements 154 and 158 are maintained separated by means of a spring 164 (Fig. 14). Each shaft 152 projects completely through the medial plate 126 rearwardly thereof and has mounted thereon and secured thereto an elongated sleeve 170 which is threaded as at 172 along a major portion of its length and which is adapted to receive thereon an anti-friction bearing assembly in the form of a retaining nut 174 in which there is disposed a hardened steel ball 176 designed for cooperation with a clutch actuating finger 178 (see Figs. 10 and 11 carried on a selector shaft 180. A coil spring is disposed within the sleeve 170 and bears at one end against the ball 176 and at the other end against the end of the shaft 152 to transmit any thrust exerted upon the ball 176 to the shaft 152 for clutch engaging purposes.

The shaft 180 (Figs. 8, 10 and 11) is capable of limited slidable movement in an axial direction and, toward this end, one end thereof is rotatably and slidably disposed in the medial plate 126 of the floating framework 122 and the other end thereof is slidably mounted in a bushing 182 which is pressed into the bore of the sleeve portion 184 of a clutch element 186 forming one part of a clutch assembly 188. The sleeve portion 184 has mounted thereon a gear 190 and a set screw 192 extends through the hub portion of the gear 190 and through the sleeve 184 and bears against the bushing 182 to retain the same in fixed position relative to the gear 190. The sleeve portion 184 of the clutch element 186 is journaled in a sleeve 194 which is fitted within a hub or boss 196 formed in the end plate 128 of the framework 122.

The clutch assembly 188 includes a second clutch part 198 which is pinned as at 200 to the shaft 180 and which, as a consequence, is rotatable and axially movable therewith. A spool-like sleeve 202 surrounds the shaft 180 and is concentric with the clutch part 198. This spool-like sleeve 202 is provided with an out-turned flange 204 which serves to retain an insulating ring 206 in position on the clutch part 198. A spring 208 surrounds the shaft 180 and bears at one end against a collar 210 and at the other end against the clutch part 198 and serves to normally maintain the clutch assembly 188 engaged.

A friction member 189 is secured to the plate 126 and is provided with a friction surface 191 designed for cooperation with a friction surface 193 carried on a friction disc 195 secured as at 197 to the shaft 180. Inasmuch as the spring 208 normally urges the shaft 180 to its extreme right-hand position, as shown in Fig. 10, the friction disc 195 is normally maintained out of engagement with the friction member 189.

A brush 212 forming part of a distributor assembly 214 (see also Fig. 3) is mounted in the insulating ring 206 and is provided with a short finger 216 and a long finger 218, the former bearing against an inner distributor ring 220 and the latter bearing against a series of outer distributor segments 222 carried in a distributor block 224 which is supported by means of spacing members 226 from the end plate 128.

The collar 210 is provided with a pair of trunnions 230 which project into slots 232 formed in a yoke 234 which is pivoted as at 236 to a bracket 238 which is bolted or otherwise secured as at 240 to the plate 126. The other end of the yoke 234 is provided with a pair of slots 242 into which there extend a pair of trunnions 244 carried on the core element 246 of a clutch magnet CM bolted or otherwise secured as at 248 to the plate 126.

From the above description of parts it will be seen that upon energization of the clutch magnet CM its core 246 will be attracted, thus swinging the yoke member 234 in a clockwise direction about its pivotal axis 236, so as to cause the trunnions 230 on the collar 210 and, consequently, the collar itself, to be moved axially to the left as viewed in Figs. 8 and 10. Such movement of the collar 210 causes the shaft 180 to be moved axially, thus removing the driven element 198 of the clutch assembly 188 from engagement with the driving element 186 thereof and causing the friction surfaces 191 and 193 to become engaged, thus terminating further rotation of the shaft 180 so that the selector finger 178 ceases its revolution about the axis of the shaft 180.

Referring now to Fig. 8, the gear 199 meshes with a smaller gear 250 mounted on a stud 252 carried by the rear end plate 128. The gear 250 is integrally formed with a larger gear 253 and this latter gear meshes with a smaller gear 254 mounted on the drive shaft 114. As will be pointed out hereinafter, upon closure of the various electrical contacts employed in connection with the operation of the electrical arm, the motor M will be energized and the drive shaft 114 caused to rotate, thus causing the shaft 180 to be rotated and causing the selector finger 178 to revolve about the axis of the shaft 180. Immediately after the motor becomes energized, selection of a predetermined type of motion is made and the selector finger 178 moves into register with one of the clutch assemblies 144, 146, 148 or 150, as the case may be, after which, due to certain relay instrumentalities employed in connection with the present invention, the clutch magnet CM becomes energized and, as a consequence, the shaft 180 is caused to be moved to the left, as viewed in Fig. 10, thus carrying with it the selector finger 178 which bears against the hardened steel ball 176 of the selected clutch assembly to move the clutch element 154 into engagement with the constantly rotating clutch element 158.

*The electrical instrumentalities*

THE POWER SUPPLY

The electrical instrumentalities associated with the electrical arm are the previously mentioned motor M which is supported in the elbow joint structure 20 by means of a floating connection; the distributor 214 contained in the forearm section proper 18 near the rear end thereof; the clutch selector magnet CM likewise contained within the forearm section proper 18; the battery unit B which is adapted to be maintained within the right-hand trousers pocket of the amputee; a pair of relay magnets R1 and R2 together with their operating contacts which may conveniently be supported from the hip plate 546; the stump switch 72 which is supported on a bracket 564 mounted on the stump-receiving socket 48 of the upper arm structure 19; a pair of toe contacts Sb and Sl in one of the shoes of the user, together with electrical wiring which is conveniently distributed within the arm structure and in and about the body of the amputee in such a manner as to most effectively perform the required functions, all in a manner that will be set forth when the electrical circuits for the arm are described.

THE STUMP SWITCH

Referring now to Figs. 1, 2 and 3, the stump switch assembly 72 is suitably mounted on the bracket 564 which in turn is attached to the stump-receiving socket 48 on the inner side of the upper arm stump between the stump and the body of the amputee. The stump switch assembly 72 projects upwardly in front of an opening 575 provided in the side of the stump-receiving socket for the purpose of allowing the amputee to project his stump biceps through the opening and against a control finger 577 which is pivoted as at 579 above the opening 575 and which depends downwardly in front of the opening to selectively manipulate a series of contacts associated with the stump switch. An operating finger 581 is associated with the switch assembly 72 and is positioned in the path of movement of the control finger 577.

In Fig. 3, it will be seen that three sets of contacts labeled 1, 2 and 3 are associated with the stump switch assembly 72. Contact 1 is normally maintained open but is adapted to become immediately closed upon any projection of the stump biceps whatsoever. Contacts 2 and 3 are each of the single pole double throw type which normally assume the position shown in Fig. 3.

In the full line position of the stump biceps the contacts 1 are open and the contacts 2 and 3 assume their normal positions. In the dotted line position of the biceps the contacts 1 become closed while the contacts 2 and 3 still remain in their normal position. With the biceps in its broken line position the contacts 1 remain closed, while the contacts 2 and 3 both become reversed. As will be pointed out when the circuit diagram of Fig. 3 is explained, the contacts 1 when closed effect energization of a circuit leading through the motor M to energize the motor and cause the same to operate in one direction. With the contacts 1 closed and the contacts 2 and 3 reversed, the motor circuit will still be energized but with current of reverse polarity, thus causing the motor to run in the opposite direction and reverse the character of movement selected for the artificial arm by the use of a pair of toe switches contained in the shoe of the amputee, whose nature and function will be described subsequently.

*The electrical circuits*

THE MOTOR CIRCUIT

Referring now to Fig. 3 wherein the circuit diagram for the electrical arm is shown, initial manipulation of the stump switch 72 by a partial extension of the stump biceps serves to close the 1 contacts of this switch while allowing the 2 and 3 contacts thereof to maintain their normal positions as shown. Thus a circuit will be established from the positive side of the battery B through a master switch Sm, 1 contacts of the stump switch 72, 2 contacts (normal), wires a, b, c, d, motor M, wires e, f, 3 contacts of the switch 72 (normal), and wire g to the negative side of the battery. Completion of this circuit serves to energize the motor M and, since this motor is of the reversible type and the current passes through the field coil winding thereof in a predetermined direction, the motor shaft will commence to rotate in a corresponding direction to obtain forward movement for the selected type of operation of the electrical arm.

CONTACT SELECTION

The initial effect of closing the 1 contacts of the stump switch 72 is to cause the motor to run in the desired direction and thereafter selection of one of the four clutches 144, 146, 148 or 150 associated with the clutch assembly is made according to the type of control desired by the amputee and evidenced by his manipulation of the toe contacts $Sb$ and $Sl$. The following table will illustrate the manner in which the four possible types of control may be attained:

| Type of Control | Toe Contact Operation | Relay Operation |
|---|---|---|
| Finger Manipulation | $Sb$ open, $Sl$ open | R1 deenergized. R2 deenergized. |
| Hand and Wrist Pronation | $Sb$ open, $Sl$ closed | R1 deenergized. R2 energized. |
| Elbow Flexion | $Sb$ closed, $Sl$ open | R1 energized. R2 deenergized. |
| Hand Flexion | $Sb$ closed, $Sl$ closed | R1 energized. R2 energized. |

HAND AND WRIST PRONATION

For effecting hand and wrist pronation in either direction the motor circuit remains the same and a description thereof is believed to be unnecessary. To effect hand and wrist pronation the little toe is depressed, thus closing the contact $Sl$ and establishing a circuit from the battery B through the master switch $Sm$, 1 contacts of the switch 72, 2 contacts (normal), wires $a$, $b$, $o$, $p$, magnet R2, wire $c$, contact $Sl$ plate 568, wires $r$, $l$, $f$, 3 contacts of the switch 72 (normal), and wire $g$, to the source. Energization of the magnet R2 causes reversal of the 2 contacts thereof thus connecting the hand and wrist pronation segment 222 to the negative side of the battery through a circuit which exists from this segment through wire $s$, 1 contacts of the magnet R2 (reversed), 1 contacts of the magent R1 (normal), wires $k$, $l$, $f$, 3 contacts of the switch 72, and wire $g$ to the battery B. It is obvious that when the direction of rotation of the motor shaft is reversed, hand and wrist pronation in the opposite direction will occur.

ELBOW FLEXION

For elbow flexion the big toe is depressed to close the contact $Sb$ and establish a circuit through the magnet R1 leading from the battery B through the master switch $Sm$, 1 contacts of the switch 72, 2 contacts (normal), wires $a$, $b$, $o$, $t$, magnet R1, wire $u$, contact $Sb$, wires $r$, $l$, $f$, 3 contacts of the switch 72 and wire $g$ to the battery B. Obviously elbow flexion in either direction will involve the same circuit by a reversal of the motor M.

Upon energization of the magnet R1 a circuit will exist from the elbow flexion segment through wire $v$, 2 contacts of the magnet R2 (normal), 1 contacts of the magnet R1 (reversed), wires $k$, $l$, $f$, 3 contacts of the switch 72, and wire $g$ to the battery.

HAND FLEXION

For hand flexion purposes, both the big toe and the little toe are depressed to close the contacts $Sb$ and $Sl$ and energize both the magnets R1 and R2 through circuits previously described. Upon energization of these two magnets, a potential circuit will exist from the hand flexion segment 222 through wire $w$, 2 contacts of the magnet R2 (reversed), 1 contacts of the magnet R1 (reversed), wires $k$, $l$, $f$, 3 contacts of the switch 72 (normal), wire $g$ to the battery. Reversal of the hand flexion operation is, of course, obtained through the same circuit with the polarity of the motor M reversed.

What is claimed is:

1. In a selective clutch mechanism of the character described, a plurality of pairs of coacting clutch elements each including a rotatable driving element and a rotatable driven element, means for selectively rotating said driving elements in unison in either direction, means normally maintaining the clutch elements of each pair disengaged, clutch-engaging means common to said clutch pairs, means for moving said clutch-engaging means into register with said clutch pairs successively and repeatedly, said clutch-engaging means also being shiftable from a position of registry with each clutch pair into direct engagement with one of the elements thereof to move the latter into engagement with the other element thereof and effect movement of the driven element in the direction of movement of the driving element, a solenoid operable upon energization thereof to shift said clutch-engaging means into clutch-engaging position, a distributor assembly including a distributor contact for each clutch pair, means for sensing said contacts successively in timed sequential relation to the successive registry between said clutch-engaging means and the clutch pairs, means for selectively applying electric current to said contacts, and means operable upon sensing of an energized contact to energize said solenoid to cause engagement of the selected clutch pair.

2. In a selective clutch mechanism of the character described, a plurality of pairs of coacting clutch elements each including a driving element and a driven element mounted for rotation about a common axis, the axes of said pairs being equally spaced about a common axis, means for rotating said driving element in unison, means normally maintaining the clutch elements of each pair disengaged, a clutch operating finger mounted for rotation about said common axis to bring the same successively into register with said clutch pairs, means for rotating said finger, said finger also being shiftable axially when in register with a clutch pair to engage one of the elements thereof and move the same into engagement with the other element and effect movement of the driven element, a solenoid operable upon energization thereof to shift the finger into clutch engaging position, a distributor assembly including a distributor contact for each clutch pair, means for sensing said contacts successively and in timed sequential relation to the successive registry between the finger and clutch pairs, means for selectively applying energizing current to said contacts, and means operable upon sensing of an energized contact to energize said solenoid, shift said finger, and cause engagement of the selected clutch pair.

3. In a selective clutch mechanism of the character described, a plurality of pairs of coacting clutch elements each including a driving element and a driven element mounted for rotation about a common axis, the axes of said pairs being equally spaced about a common axis, means for rotating said driving element in unison, means normally maintaining the clutch elements of each pair disengaged, a clutch operating finger mounted for rotation about said common axis to bring the same successively into register with said clutch pairs, means for rotating said finger, said finger also being shiftable axially when in register with a clutch pair to engage the driven element thereof and move the same into engagement with the other element and effect movement of the latter element, a solenoid operable upon energization thereof to shift the finger into clutch engaging poistion, a distributor assembly including a distributor contact for each clutch pair, means for sensing said contacts successively and in timed sequential relation to the successive registry between the finger and clutch pairs, means for selectively applying energizing current to said contacts, and means operable upon sensing of an energized contact to energize said solenoid, shift said finger, and cause engagement of the selected clutch pair.

4. In a selective clutch mechanism of the character described, a plurality of pairs of coacting clutch elements each including a driving element and a driven element mounted for rotation about a common axis, the axes of said pairs being equally spaced about a common axis, means for selectively rotating said driving element in unison in either direction, means normally maintaining the clutch elements of each pair disengaged, a clutch operating finger mounted for rotation about said common axis to bring the same successively into register with said clutch pairs, means for rotating said finger, said finger also being shiftable axially when in register with a clutch pair to engage one of the elements thereof and move the same into engagement with the other element and effect movement of the driven element in the direction of movement of the driving element, a solenoid operable upon energization thereof to shift the finger into clutch engaging position, a distributor assembly including a distributor contact for each clutch pair, means for sensing said contacts successively and in timed sequential relation to the successive registry between the finger and clutch pairs, means for selectively applying energizing current to said contacts, and means operable upon sensing of an energized contact to energize said solenoid, shift said finger, and cause engagement of the selected clutch pair.

5. In a selective clutch mechanism of the character described, a plurality of pairs of coacting clutch elements each including a driving element and a driven element mounted for rotation about a common axis, the axes of said pairs being equally spaced about a common axis, an electric motor, means operatively connecting the motor and driving elements for driving the latter in unison, means normally maintaining the clutch elements of each pair disengaged, a clutch operating finger mounted for rotation about said common axis to bring the same successively into register with said clutch pairs, means operatively connecting the motor and finger for driving the latter, said finger also being shiftable axially when in register with a clutch pair to engage one of the elements thereof and move the same into engagement with the other element and effect movement of the driven element, a solenoid operable upon energization thereof to shift the finger into clutch engaging position and at the same time to disengage its connection with the motor, a distributor assembly including a distributor contact for each clutch pair, means for sensing said contacts successively and in timed sequential relation to the successive registry between the finger and clutch pairs, means for selectively applying energizing current to said contacts, and means operable upon sensing of an energized contact to energize said solenoid, shift said finger, and cause engagement of the selected clutch pair.

6. In a selective clutch mechanism of the character described, a plurality of pairs of coacting clutch elements each including a driving element and a driven element mounted for rotation about a common axis, the axes of said pairs being equally spaced about a common axis, an electric motor, means operatively connecting the motor and driving elements for driving the latter in unison, means normally maintaining the clutch elements of each pair disengaged, a clutch operating finger mounted for rotation about said common axis to bring the same successively into register with said clutch pairs, means operatively connecting the motor and finger for driving the latter, said finger also being shiftable axially when in register with a clutch pair to engage one of the elements thereof and move the same into engagement with the other element and effect movement of the driven element, a solenoid operable upon energization thereof to shift the finger into clutch engaging position and at the same time to disengage its connection with the motor, means operable upon shifting of said finger for applying a braking torque thereto to terminate rotation thereof about the common axis and to maintain the same in registry with a selected clutch pair, a distributor assembly including a distributor contact for each clutch pair, means for sensing said contacts successively and in timed sequential relation to the successive registry between the finger and clutch pairs, means for selectively applying energizing current to said contacts, and means operable upon sensing of an energized contact to energize said solenoid, shift said finger, and cause engagement of the selected clutch pair.

7. In a selective clutch mechanism of the character described, a plurality of pairs of coacting clutch elements each including a driving element and a driven element mounted for rotation about a common axis, the axes of said pairs being equally spaced about a common axis, a reversible electric motor, means operatively connecting the motor and driving elements for driving the latter in unison in either direction, means normally maintaining the clutch elements of each pair disengaged, a clutch operating finger mounted for rotation about said common axis to bring the same successively into register with said clutch pairs, means operatively connecting the motor and finger for driving the latter, said finger also being shiftable axially when in register with a clutch pair to engage one of the elements thereof and move the same into engagement with the other element and effect movement of the driven element in the direction of the driving element, a solenoid operable upon energization thereof to shift the finger into clutch engaging position and at the same time to disengage its connection with the motor, a distributor assembly including a distributor contact for each clutch pair, means for sensing said contacts successively and in timed sequential relation to the successive registry between the finger and clutch pairs, means for selectively applying energizing current to said contacts, and means operable upon sensing of an energized contact to energize said solenoid, shift said finger, and cause engagement of the selected clutch pair.

References Cited in the file of this patent

UNITED STATES PATENTS

| Number | Name | Date |
| --- | --- | --- |
| 1,846,687 | Mentor | Feb. 23, 1932 |
| 2,098,691 | Neff | Nov. 9, 1937 |
| 2,488,324 | Pegard | Nov. 15, 1949 |